(12) United States Patent
Rantalainen et al.

(10) Patent No.: US 7,039,433 B2
(45) Date of Patent: May 2, 2006

(54) METHODS FOR DETERMINING TIMES AND CHANGES OF TIMES OF TRANSMISSION, RADIO COMMUNICATIONS SYSTEM AND PROCESSOR

(75) Inventors: Timo Rantalainen, Helsinki (FI); Jani Moilanen, Helsinki (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 10/362,397

(22) PCT Filed: Jun. 27, 2001

(86) PCT No.: PCT/EP01/07330

§ 371 (c)(1),
(2), (4) Date: Apr. 25, 2003

(87) PCT Pub. No.: WO03/003615

PCT Pub. Date: Jan. 9, 2003

(65) Prior Publication Data

US 2003/0162505 A1 Aug. 28, 2003

(51) Int. Cl.
H04B 7/01 (2006.01)

(52) U.S. Cl. .............. 455/502; 455/503; 455/436; 455/456.1; 342/375; 342/457; 342/387

(58) Field of Classification Search .......... 455/502, 455/503, 436, 456.1; 342/375, 457, 387
See application file for complete search history.

(56) References Cited

U.S. PATENT DOCUMENTS 5,361,395 A * 11/1994 Yamamoto ............ 455/436
5,646,632 A * 7/1997 Khan et al. ............ 342/375
5,848,063 A * 12/1998 Weaver et al. ............ 370/331

(Continued)

FOREIGN PATENT DOCUMENTS

WO   WO 98/52376   11/1998

(Continued)

OTHER PUBLICATIONS

Spirito M A et al. "Mobile Stations Location in Future TDMA Mobile Communication Systems" VTC 1999-Fall. IEEE VTS 50th, Vehicular Technology Conference. Gateway to the 21th. Century Communciations Village. Amsterdam, Sep. 19-22, 1999, IEEE Vehicular Technology Conference, New York, NY: IEEE, US, vol. 2 Conf. 50, Sep. 1999, pp. 790-794, XP000924618.

(Continued)

Primary Examiner—Quochien B. Vuong
Assistant Examiner—Minh D. Dao
(74) Attorney, Agent, or Firm—Cohen, Pontani, Lieberman & Pavane

(57) ABSTRACT

The invention relates to a method for determining transmission times of signals transmitted by at least one radio transmitter BTS. In order to enhance the accuracy and reliability of estimates of transmission times or of changes of the transmission time of signals transmitted by radio transmitters BTS, it is proposed that a difference in the time level of estimates of the transmission times based on the measurement results of two different radio receivers LMU A,B is taken into account in a filtering of the estimates for obtaining an accurate value for the transmission times. It is further proposed that the changes of the transmission times estimated at different receivers LMU A,B is averaged for obtaining an accurate information about the changes. The invention equally relates to a corresponding radio communications system and to a processing unit for such a system.

29 Claims, 4 Drawing Sheets

U.S. PATENT DOCUMENTS

| | | | |
|---|---|---|---|
| 5,873,044 A * | 2/1999 | Goldberg et al. | 455/503 |
| 5,900,838 A * | 5/1999 | Khan et al. | 342/457 |
| 6,201,499 B1 * | 3/2001 | Hawkes et al. | 342/387 |
| 6,205,125 B1 * | 3/2001 | Proctor et al. | 370/328 |

FOREIGN PATENT DOCUMENTS

| | | |
|---|---|---|
| WO | WO 99/33302 | 7/1999 |
| WO | WO 99/53707 | 10/1999 |
| WO | WO 99/57826 | 11/1999 |

OTHER PUBLICATIONS

"Digital cellular telecommunications system (Phase 2+); Location Services (LCS); (Functional description)—stage 2 (GSM 03.71 version 8.0.0. Release 1999)", ETSI TS 101 724 v8.0.0 (2000-08), Technical Specification, Global System for Mobile Communications, 107 pages.

* cited by examiner

US 7,039,433 B2

METHODS FOR DETERMINING TIMES AND CHANGES OF TIMES OF TRANSMISSION, RADIO COMMUNICATIONS SYSTEM AND PROCESSOR

PRIORITY CLAIM

This is a national stage of PCT application No. PCT/EP01/07330, filed on Jun. 27, 2001. Priority is claimed on that application.

FIELD OF THE INVENTION

The invention relates to methods for determining times of transmission and changes in the times of transmissions of signals transmitted by at least one radio transmitter, to a radio communications system and to a processor for a radio communications system.

BACKGROUND OF THE INVENTION

In a radio communications system, it can be of importance to be able to determine the time at which signals are transmitted by radio transmitter of the system.

The possibility to determine the timing of transmissions of different radio transmitters can be employed e.g. advantageously to geographically localize a mobile station in a radio communications system. To this end, e.g. first the timing difference between at least two pairs of radio transmitters is determined. The timing difference can be determined based on the measurements of at least one radio receiver positioned at a known location. The mobile station moreover measures the difference in the reception time of signals transmitted by the same pairs of radio transmitters.

The location of the mobile station can then be calculated based on the time differences measured at the mobile station and the known timing difference of the at least two pairs of radio transmitters.

For illustration, an example of such a localization method will now be described in more detail with reference to FIG. 1.

FIG. 1 schematically shows a GSM (Global System for Mobile communications) radio communications system with three GSM base transceiver stations BTS 1–3. The base transceiver stations BTS 1–3 constitute a network of radio transmitters. Further, two radio receivers LMU1,LMU2 and a mobile station MS are shown. In GSM Location Services standards, such receiving units are called Location Measurement Units (LMU). In the depicted system, the current location of the mobile station MS is to be determined.

A network of radio transmitters like the depicted base transceiver stations BTS 1–3 has some timing system, which is based for example on respective internal clocks or on a clock of an element located higher in the network hierarchy. Each radio transmitter transmits radio signals according to the clock signal with which it is provided and some set of rules. The time differences between the used clocks determines how much earlier or later one radio transmitter sends a signal than a respective other radio transmitter.

Since GSM is a TDMA (Time Division Multiple Access) system, the depicted GSM base transceiver stations BTS 1–3 transmit radio bursts in time slots using basically the same time slot structure. To this end, each GSM base transceiver stations gets a hierarchical clock signal from the network, e.g. through PCM (Pulse Code Modulation) lines. In theory two base transceiver stations, for example BTS 1 and BTS 2 of FIG. 1, should therefore send TDMA bursts exactly at the same moment. However, this is not the normal case. In practice, timing differences still exist. The timing difference between two base transceiver stations is also referred to as Real Timing Difference (RTD). If base transceiver station BTS 1 sends a burst at the time $t_1$ and base transceiver station BTS 2 sends a burst at the time $t_2$, the Real Timing Difference between them is $RTD=t_1-t_2$ or $RTD=t_2-t_1$, depending on the definition of the RTD. Only if the network is really synchronized, the Real Timing Difference is zero.

A possibility for determining the Real Timing Difference between different radio transmitters is described e.g. in PCT/EP97/02400. For the method proposed in this document, radio receivers have to be situated at fixed positions around the radio transmitters. In FIG. 1, this is given by the measurement units LMU1,2 which are positioned at known locations close to the base transceiver stations BTS 1–3.

The first measurement unit LMU1 then receives a radio signal from the first base transceiver station BTS 1 and from the second base transceiver station BTS 2, and determines the time interval between these two receptions: The time interval is the so-called Observed Time Difference (OTD). In case a burst from the first base transceiver station BTS 1 is received at a time $t_3$ and a burst from the second base transceiver station BTS 2 is received at a time $t_4$, the OTD for this pair of base transceiver stations is $OTD=t_4-t_3$ or $OTD=t_3-t_4$.

It is to be noted that in GSM, the measurement units can be similar to a mobile station. In fact in GSM, OTD is already specified as a function for mobile stations in order to support the so called pseudo-synchronous handover. OTD is in this case the time interval, as observed by the mobile station, between the reception of two bursts from two different base transceiver stations. For OTD measurements in mobile stations, in practice one base transceiver stations is the serving base transceiver station, and the other one is one of the neighbor base transceiver station.

The OTD determined at measurement unit LMU1 is composed of the RTD between the first base transceiver station BTS 1 and the second base transceiver station BTS 2, and of a Geometrical Time Difference GTD:

$$OTD=RTD+GTD \qquad (1)$$

More specifically, the Geometrical Time Difference is the time difference in transmission between two signals from two different transmitters (BTS) to a single receiver (LMU, MS) due to geometry. If the distance of the first base transceiver station BTS 1 to the first measurement unit LMU1 is $d_1$ and the distance of the second base transceiver station BTS 2 to the first measurement unit LMU1 is $d_2$, as indicated in FIG. 1, then the Geometrical Time Difference is $GTD=(d_1-d_2)/c$, where c is the speed of radio waves. Thus, since the positions of the base transceiver stations BTS 1,2 and the first measurement unit LMU1 are known, GTD values can be calculated, OTD values be measured, and RTD values be obtained.

The same measurements are carried out by the second measurement unit LMU2 for obtaining the timing difference RTD of base transceiver stations BTS 1 and BTS 3. In this case, the GTD is calculated based on a distance of the first base transceiver station BTS 1 to the second measurement unit LMU2 of $d_3$, and on a distance of the third base transceiver station BTS 3 to the second measurement unit LMU2 of $d_4$, as indicated in FIG. 1. Alternatively, also the RTD between base transceiver stations BTS 1 and 3 could have been determined based on measurements by the first measurement unit LMU1, in case this measurement unit is also located close enough to base transceiver stations BTS 3 for receiving signals.

The thus known Real Timing Difference between at least two pairs of base transceiver stations BTS 1,2 and BTS 1,3 can then be exploited for determining the geographical location of the mobile station MS.

An example for an E-OTD (Enhanced OTD) location method for GSM has been standardized in GSM 03.71 "Location Services (LCS) Stage 2", which contains also a general description of E-OTD. The E-OTD location method described in the standard is based as well on the above mentioned equation (1), only in this case, the RTD is known, while the GTD is to be determined.

If the GSM mobile station MS performs OTD measurements for signals received from pairs of base transceiver stations BTS 1,2 and BTS 1,3 respectively, and corresponding RTD values are known for these pairs, e.g. measured by special RTD receivers as described above, then the Geometrical Time Difference can be calculated for the mobile station for each pair of base transceiver stations BTS 1,2 and BTS 1,3 based on the above mentioned equation (1). The respective Geometrical Time Difference and the information of the position of the corresponding pair of base transceiver stations BTS 1,2, BTS 1,3 define a hyperbola H1, H2 on which the mobile station is located. When at least two hyperbolas H1, H2 are defined, the estimate of the location of the mobile can be found at their intersection as shown in FIG. 1.

One possible location system is such that mobile stations perform OTD measurements, and report the results to the network, where location calculation is done based on the known RTD.

If receivers, like Local Measurement Units, have absolute time available, they can report Absolute Time (AT) values and/or Absolute Time Difference (ATD) values as reception times of received signals to the network. Absolute time can be made available to receivers e.g. based on the Global Positioning System (GPS). The AT value is a time stamp based on the absolute time clock for the reception of the signal from a transmitter like a base transceiver station. ATD is the same as RTD with the exception that also at least one AT of the received signals of the pair of transmitters is known.

A problem connected generally to RTD and AT/ATD measurements are Non Line Of Sight (NLOS) conditions. If there is a NLOS situation between a radio transmitter and a radio receiver, the signal is reflected and thus its propagation path contains extra length. The estimate of the geographic influence on the received signals based on known transmitter and receiver coordinates, e.g. using GTD, is consequently wrong, and the AT/ATD or RTD estimate includes an extra error. Similar problems are encountered with multipath conditions, i.e. when a Line of Sight (LOS) component is present between transmitter and receiver, but also strong reflected components, which might make a detection of the LOS component difficult.

SUMMARY OF THE INVENTION

It is an object of the invention to enhance the accuracy and reliability of estimates of transmission times of signals transmitted by radio transmitters. It is equally an object of the invention to enhance the accuracy and reliability of estimates of changes in the transmission times of signals transmitted by radio transmitters.

For a first aspect of the invention, a method is proposed for determining times of transmission of signals transmitted by at least one radio transmitter. The method comprises as a first step transmitting signals by the at least one radio transmitter. In a next step, transmitted signals are received by at least two radio receivers. For each of the radio receivers, the respective times of reception of the received signals are then determined. Further, for each of said radio receivers the times of transmission of said received signals are estimated. The estimation is based on the determined times of reception of the received signals and on the geographical location of the at least one radio transmitter and the respective radio receiver. Finally, the estimated times of transmission are filtered based on a determined difference in the time levels of the times of transmission estimated separately for the at least two radio receivers for obtaining accurate values for the transmission times of signals transmitted by said radio transmitter.

For the first aspect of the invention, moreover a corresponding radio communications system is proposed. The radio communications system thus comprises at least one radio transmitter for transmitting radio signals and at least two radio receivers for receiving signals transmitted by said at least one radio transmitter and for determining the respective times of reception of received signals. The system further comprises processing means. These processing means are suited on the one hand for estimating for each of said radio receivers the times of transmission of received signals based on the determined times of reception of said received signals and on the geographical location of the at least one radio transmitter and the respective radio receiver. On the other hand, the processing means are suited for filtering the estimated times of transmission based on a determined difference in the time level of the times of transmission estimated separately for the at least two radio receivers for obtaining accurate values for the transmission times of signals transmitted by said radio transmitter.

For a second aspect of the invention, a method is proposed for determining changes in the times of transmission of signals transmitted by at least one radio transmitter. This method comprises again as a first step transmitting signals by the at least one radio transmitter and as a second step receiving transmitted signals by at least two radio receivers. Then, for each of the radio receivers values indicative of the respective changes in the times of reception of the received signals are determined. These values can represent in particular the changes in the times of reception or the changes in times of transmission of the received signals, which times of transmission are estimated based on the times of reception of the received signals. In both cases, the values are the same. Finally, the values indicative of the respective changes of the times of reception determined for said at least two radio receivers are averaged in order to obtain a reliable information about the changes of the times of transmission of the signals transmitted by said at least one radio transmitter.

Also for the second aspect of the invention, a corresponding radio communications system is proposed. As the system for the first aspect of the invention, the radio communications system for the second aspect comprises at least one radio transmitter for transmitting radio signals, and at least two radio receivers for receiving signals transmitted by the at least one radio transmitter. Moreover, the system comprises processing means for determining for each of said radio receivers values indicative of the respective changes in the times of reception of the received signals. The processing means are additionally employed for averaging the values indicative of the respective changes of the determined times of reception determined for said at least two radio receivers in order to obtain a reliable information about the changes of the times of transmission of the signals transmitted by said at least one radio transmitter.

The invention proceeds from the idea that signals received by several radio receivers but originating from the same radio transmitter can be used in an advantageous way when determining information about the transmission times of the signals, if it is taken into account that different delays on the transmission paths contribute to a difference in the time level of transmission times of received signals estimated for each of the different radio receivers. The term delay is used to indicate the portion of the transmission time of received signals that surpasses the theoretical transmission time on a LOS transmission path between the transmitter and the respective receiver. The expression time level of estimated transmission times is used for referring to the continuously increasing level of succeeding values of transmission times estimated for each of the receivers for the same transmitted signals by taking into account the respective geographical situation, i.e. in particular by assuming a LOS transmission path. A lower time level of one receiver thus indicates that signals transmitted at the same time reach this receiver with less delay than they reach another receiver with a higher time level. The offset between the time levels of two receivers can be assumed to remain essentially constant as long as the geographical location of the at least one transmitter and the two receivers is not changed.

In the first aspect of the invention, the different time levels are taken into account in a filtering applied to the estimated transmission times for determining accurate time values for the transmission times proceeding from the received signals. Since the transmission times are determined taking into account the geographic location of the radio transmitter and the radio receivers, basically only the additional delays caused by NLOS or multipath conditions are evaluated for the filtering.

In the second aspect of the invention, the difference in the time levels does not necessarily have to be determined. It is rather taken into account by estimating parameters not affected by an offset between the time levels, i.e. the drift of the reception times of signals received at the at least two receivers. These drifts can simply be averaged in order to obtain a more accurate information.

Preferably, the employed radio receivers operate on absolute time AT. The invention can then be employed for determining absolute transmission times and therefore also for ATD measurements. In existing real networks, AT capable radio receivers, e.g. GSM Local Measurement Units, already have overlapping coverage areas. This means that several radio receivers receive signals from the same radio transmitters, e.g. GSM base transceiver stations. Therefore, these existing radio receivers can be utilized for the invention. In a GSM radio communications system, moreover modified existing Serving Mobile Location Centers (SMLC) can be employed as processing means of the invention.

In a preferred embodiment of the first aspect of the invention, information from both radio receivers are included in the obtained accurate values for the transmission times. To this end, first the time levels of the estimated transmission times of the receivers are compared. Then, the time level of a first one of the receivers which is determined to be higher than the time level of the estimated transmission times of another one of the receivers is adjusted to correspond to the lower time level. That means, the estimated times of transmission are filtered by projecting the times of transmission estimated based on signals received by a first one of said radio receivers, which estimated times of transmission are later in time than the respective times of transmission estimated based on the signals received by another one of said radio receivers, to the time level of the estimated transmission times based on the signals received by said other radio receiver. As a result, the delay of signals received by the first radio receiver is reduced to the delay of the signals received by the other radio receiver, and the transmission times estimated for both receivers can be regarded as accurate values. In case more than two radio receivers are utilized, the receiver with the lowest time level is determined and the times of transmissions estimated for all or selected ones of the other receivers are projected to the time level of the radio receiver with the lowest time level.

With this embodiment, the quality of determined AT or ATD values will be improved, since the measurement results for signals with more delay than other signals are corrected. This embodiment of the invention is moreover particularly robust.

In another preferred embodiment of the first aspect of the invention, the accurate values for the transmission times are determined based only the signals received by the radio receiver that can be assumed to receive the signals with less delay. To this end, the estimated times of transmission are filtered by using exclusively the times of transmission estimated based on the signals received by a first one of said radio receivers, which estimated times of transmission indicate respective earlier times of transmission of said signals transmitted by the first radio transmitter than the estimated times of transmission based on the signals received by at least one other radio receiver.

Also with this embodiment of the invention, a better quality of determined AT and ATD values will be achieved, since the worse measurement results, i.e. the measurement results of a receiver receiving signals with more delay, are discarded.

A further improvement of the second embodiment is proposed for the case that no received signal is available for some period of time at the first radio receiver providing the better measurement results. During these periods of time, the times of transmission estimated based on signals received by another radio receiver providing worse measurement results are used. Before being used as optimized transmission times, however, these worse estimated transmission times are first corrected by compensating for a determined offset of the time level of these estimated transmission times compared to the time level of the transmission times estimated based on signals received by the first radio receiver. The offset has to be determined before the time period in which no received signals are available at the first radio receiver.

With this supplement, the accuracy of the determined final values for the transmission times will be further improved, since poor quality AT and ATD values can be used to substitute good quality measurements in case of measurement breaks in these good quality values.

In both preferred embodiments of the first aspect of the invention, before filtering the estimated transmission times, the respective estimated transmission times can be corrected according to a knowledge about expected delays on the respective transmission paths, if such knowledge is available. This can be in particular a knowledge about the environment, which enables an estimation of an expected delay caused by NLOS conditions.

In the second aspect of the invention, the values indicative of the respective changes of times of reception can be averaged with a different weighting for the at least two receivers. The weighting can be made dependent, for example, on an offset between the time levels of transmission times estimated from the reception times at the different radio receivers. Thus, the signals of radio receivers with a lower time level, indicating a lower delay on the transmission path, can have a higher influence on the resulting time slopes than the signals received by radio receivers with a higher time level.

The second aspect of the invention can be employed in particular together with some method for determining the transmission times of received signals.

In both aspects of the invention it is possible that the radio receivers base their measurements on different signal bursts transmitted by radio transmitters. In case the radio transmitter transmits bursts to be used for the time measurements in predetermined distances in time, and in case one of said radio receivers receives a burst which is at least once the predetermined distance in time later than the last burst received by another one of the radio receivers, it can be assumed that the radio receivers base their measurements on different bursts. This can be compensated by reducing the difference in the time of reception or the corresponding estimated time of transmission by a multiple of the predetermined distance in time to less than the predetermined distance in time, e.g. by a modulo operation, before further processing.

Both aspects of the invention can be employed for a situation, in which each radio receiver exclusively receives signals from another one of at least two radio transmitters, which two radio transmitters have an equal timing for transmitting signals.

Equally both aspects of the invention can be employed for a situation, in which each radio receiver receives signals from at least two different radio transmitters. Each radio receiver can then determine in addition to the time of reception of signals from at least one of said at least two radio transmitters the time difference between signals received from at least two of said at least two radio transmitters. The difference between the times of reception can then be used together with an information about the geometrical situation to determine the difference in timing used by the two radio transmitters for transmitting signals. This can be done for example as explained above with reference to equation (1).

The invention can be used in particular for determining a current location of a mobile station. This can be achieved for example by first determining a difference in timing for at least two different pairs of at least three radio transmitters as mentioned above. A mobile station can further determine the difference in the time of reception of signals transmitted by respectively one of said at least two different pairs of said at least three radio transmitters. The current geographical location of the mobile station can then be determined based on the respective differences in the time of reception of signals determined in the mobile station and on the determined differences in the timing used by said two pairs of said at least three radio transmitters. This can be achieved for example again as described above with reference to the specification GSM 03.71.

Both aspects of the invention can be employed in particular in GSM radio communications systems, but it can equally be employed in any other suitable radio transmitter network, like a WCDMA network.

BRIEF DESCRIPTION OF THE FIGURES

In the following, the invention is explained in more detail with reference to drawings, of which

DETAILED DESCRIPTION OF THE INVENTION

A first embodiment of the first aspect of the invention is described with reference to FIGS. 2 and 3.

Figure 2:
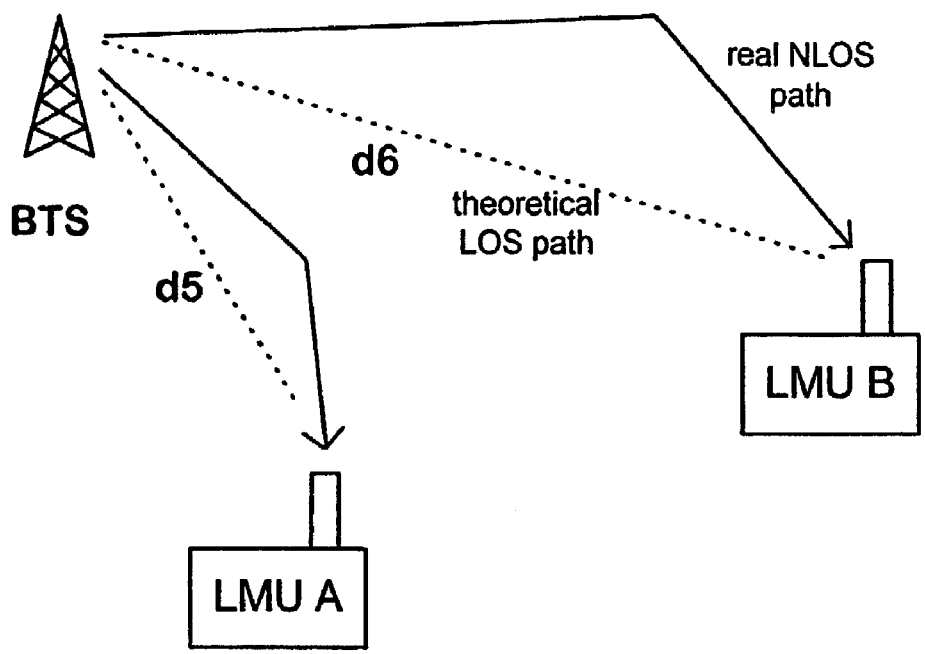
FIG. 2 illustrates a first embodiment of the invention.
Figure 2:
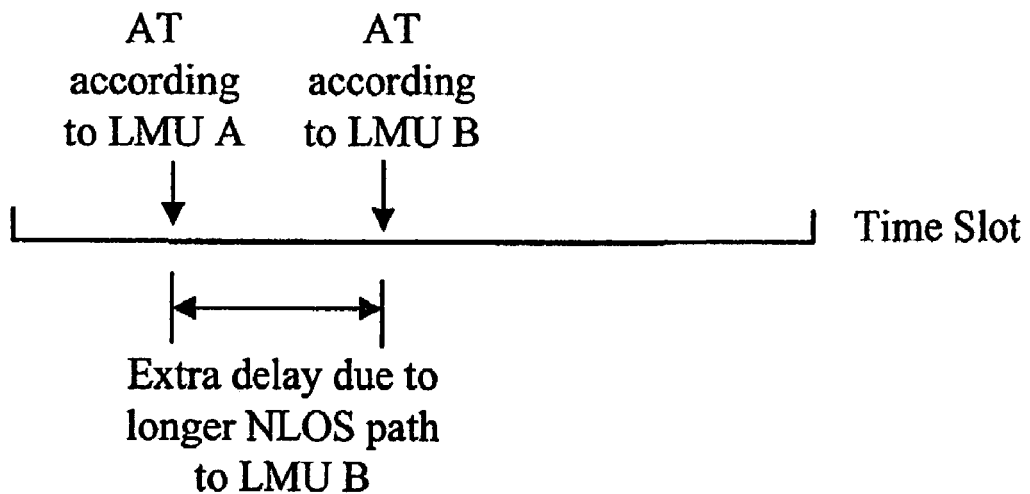

The upper part of FIG. 2 schematically shows a part of a GSM radio communications system. The depicted part of the system comprises a base transceiver station BTS and two local measurement units LMU A, B. Both measurement units LMU A, B operate based on absolute time which is obtained by the GPS. In this system, the absolute time of transmission of signals transmitted by the base station are to be determined.

Signals transmitted by the base transceiver station BTS are received by the measurement units LMU A, B. Respective theoretical LOS paths between the base transceiver station BTS and the measurement units LMU A, B are indicated in the figure by dotted lines. In practice; however, the signals will propagate between the base transceiver station BTS and the two measurement units LMU A, B along paths that may result in additional delays in the measurement due to NLOS or multipath conditions. Solid lines depicted in FIG. 2 in addition to the LOS paths between the base transceiver station BTS and the measurement units LMU A, B indicate the real NLOS paths taken in this example by signals transmitted by the base transceiver station BTS.

Each of the measurement units LMU A, B determines the absolute time of reception of received signals. The determined AT reception values are then forwarded by the measurement units LMU A, B to a Serving Mobile Location Center SMLC, which is not depicted in FIG. 2, for further processing.

The measurements of the measurement units LMU A, B are not coordinated, i.e. they may base their measurements on different bursts. In GSM, signals are usually transmitted according to a time slot structure, more specifically every 0.577 ms. Thus the time difference between transmissions of bursts is a multiple of 0.577 ms. If the measurement units LMU A, B receive signals with a time difference of more than 0.577 ms, then the measurements have most probably been made based on different transmitted bursts. The measurement results can therefore be made comparable in the SMLC by reducing the time difference with a modulo 0.577 ms division to less than 0.577 ms. Then the received signals can be assumed to result from the same transmitted burst.

The SMLC knows the geographical location of the two measurement units LMU A, B and of the base transceiver station BTS, and thus the assumed LOS distances d5, d6 between the base station and the respective measurement unit LMU A, B. Analogously to the example described with reference to FIG. 1 and equation (1), the known LOS delay is thus d5/c for signals received at the first measurement unit LMU A and d6/c for signals received at the second measurement unit LMU B. By subtracting the respective LOS delay from the respective determined AT reception values, the SMLC can thus estimate corresponding AT transmission values for each measurement unit LMU A, B, which AT transmission values constitute two separate preliminary estimations of the real transmission times.

If the absolute time values are calculated from the measurements of both measurement units LMU A, B as described above, the AT transmission values estimated for the first measurement unit LMU A will be smaller than the AT transmission values estimated for the second measurement unit LMU B, even though the burst on which the measurement was based is or can be considered the same. The reason for this is that for the second measurement unit LMU B, the real NLOS path adds more additional transmission path to the theoretical LOS path than for the first measurement unit LMU A. This difference is also depicted in the lower part of FIG. 2, which shows a time line in terms of time slots. On this time line, the AT transmission value estimated for one burst for each measurement unit LMU A, B is associated to a specific time slot of the time slot structure used by the base station.

In the first embodiment of the invention, the SMLC thus assumes that signals of the same bursts which result in a lower estimated AT transmission value have traveled a more direct path, since NLOS and multipath conditions always cause additional delays. As consequence, the SMLC only uses the respective lower estimated AT transmission values when determining the final AT transmission value. These lower AT transmission values are based in the example of FIG. 2 on the measurement results of the first measurement unit LMU A.

Only in case there is a break in the measurements of the first measurement unit LMU A for some reason, the SMLC will use the measurement results of the second measurement unit LMU B.

Figure 3:
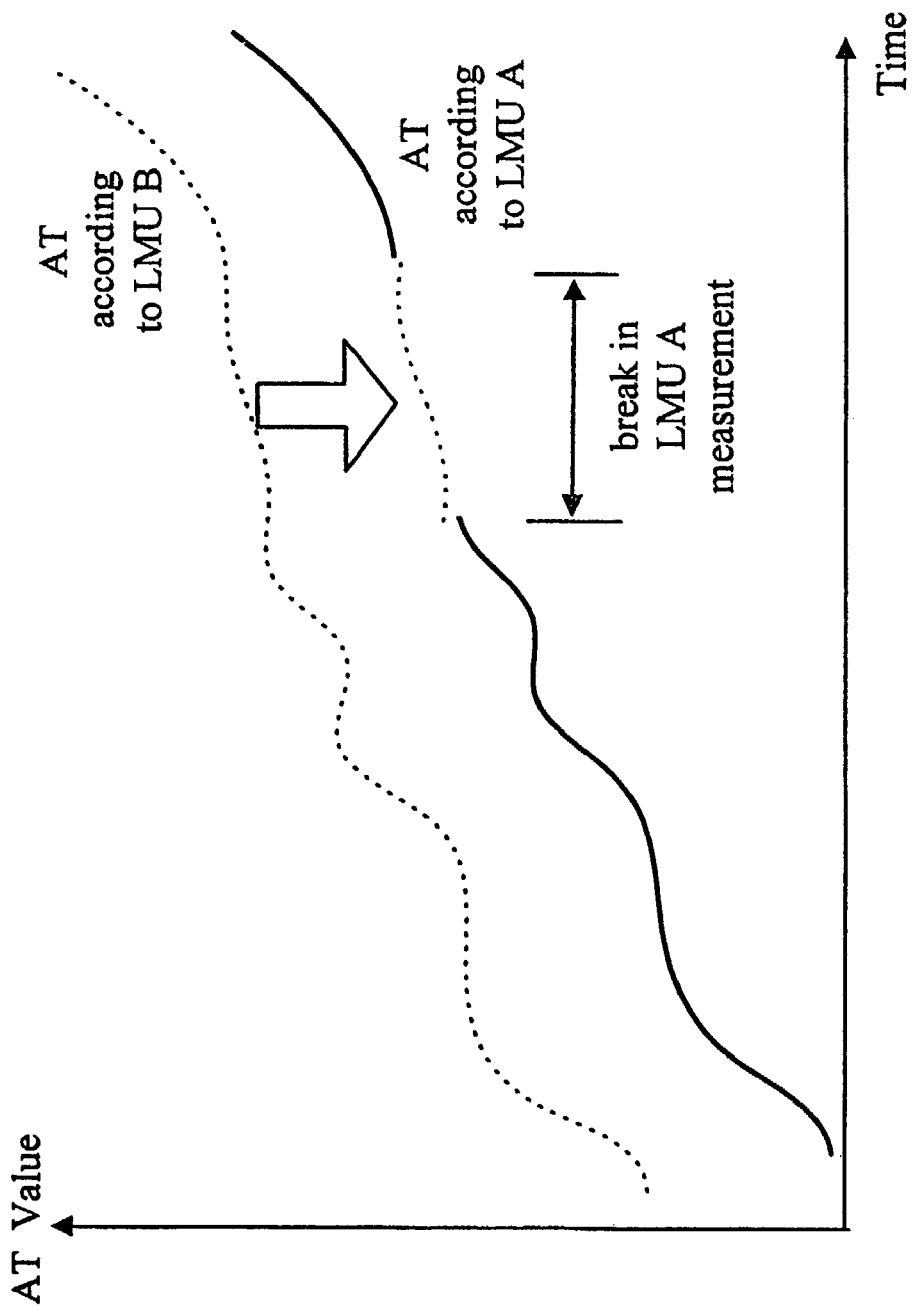
FIG. 3 is a diagram further illustrating the first embodiment of the invention.

FIG. 3 illustrates how this can be carried out. The figure is a diagram depicting the estimated AT transmission values for signals transmitted by the base station over time. An upper curve in a dotted line corresponds to the AT transmission values determined for the second measurement unit LMU B, while a lower curve in a solid line corresponds to the AT transmission values determined for the first measurement unit LMU A. The lower curve, however, is disrupted due to a break in the measurement of the first measurement unit LMU A.

During this disruption, the SMLC utilizes the AT transmission values estimated according to the measurement results of the second measurement unit LMU B. The AT transmission values estimated for the second measurement unit LMU B are corrected before being used with the offset between the second and the first measurement unit LMU B, A, which offset was determined in the SMLC before the break occurred. At the break of the solid line in the lower curve, the corrected AT transmission values are depicted as dotted line. The result is a basically continuous curve obtained for the final AT transmission values.

A second embodiment of the first aspect of the invention is equally based on a GSM radio communications system with a base transceiver station BTS and two measurement units LMU A, B as depicted in the upper part of FIG. 2. Also in this second embodiment the absolute times of transmission of signals transmitted by the base transceiver station BTS are to be determined.

Signals are transmitted by the base transceiver station BTS and received by the two measurement units LMU A, B as described with reference to the first embodiment. Moreover, AT reception values are determined in the two measurement units LMU A, B as described with reference to the first embodiment, and preliminary AT transmission values are estimated again in an SMLC based on the AT reception values determined in the first and the second measurement unit LMU A, B.

Only the processing of the preliminary AT transmission values is different in the second embodiment of the invention, as will be explained with reference to FIG. 4.

Figure 4:
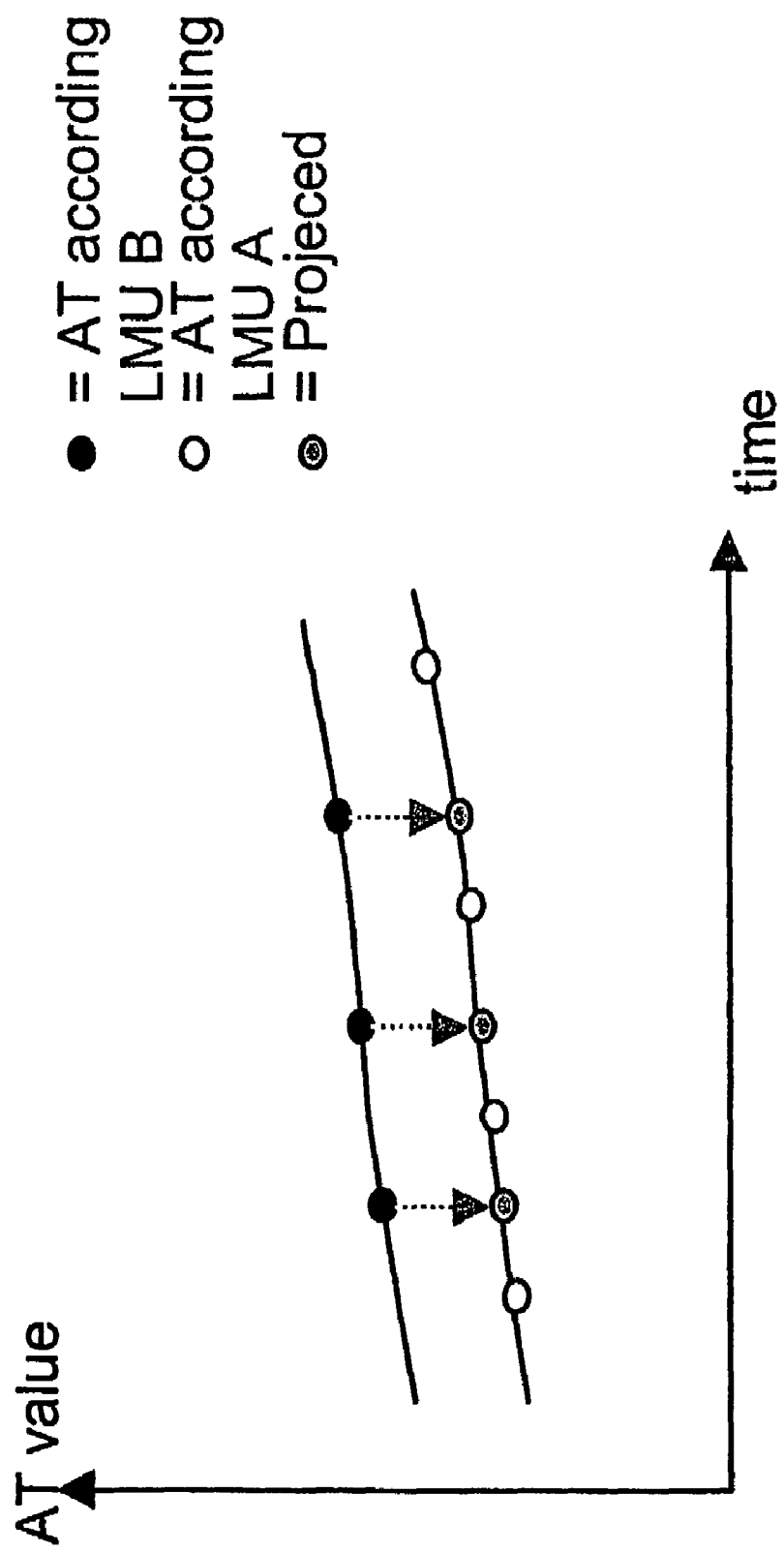
FIG. 4 is a diagram illustrating a second embodiment of the invention.

FIG. 4 is a diagram depicting preliminary AT transmission values estimated for the first and the second measurement unit LMU A, B over time. The AT transmission values of the first measurement unit LMU A are depicted as white circles, and the AT transmission values of the second measurement unit LMU B are depicted as black circles. The AT transmission values of the second measurement unit LMU B are positioned at a higher time level than those of the first measurement unit LMU A, i.e. they suggest a later time of transmission because of a longer delay by an NLOS transmission.

In this embodiment, however, the SMLC does not discard completely the AT transmission values which are based on the measurements of the measurement unit LMU B with higher AT transmission values, but rather uses the AT transmission values based on the measurement results of both measurement unit LMU A, B.

To this end, first the AT transmission values determined by both measurement units LMU A, B are filtered separately using a linear model, preferably a linear Kalman filter. Therefore, the black and white circles of FIG. 4 are connected by lines indicating the respective expected continuation of AT transmission values after each estimated AT transmission value.

Thus, a current offset between the AT transmission values of the two measurement units LMU A, B can be extrapolated each time a new AT transmission value is estimated for the second measurement unit LMU B. The AT transmission values estimated for the second measurement unit LMU B are then projected to the time level of the AT transmission values estimated for the first measurement unit LMU A. The projection is indicated in FIG. 4 by arrows, and the resulting projected AT transmission values are depicted as gray circles.

In addition, in case there is some extra knowledge about expected delays caused by NLOS conditions, for example a common knowledge about the environment, the AT reception or transmission values might be corrected additionally before the AT transmission values are filtered.

Figure 1:
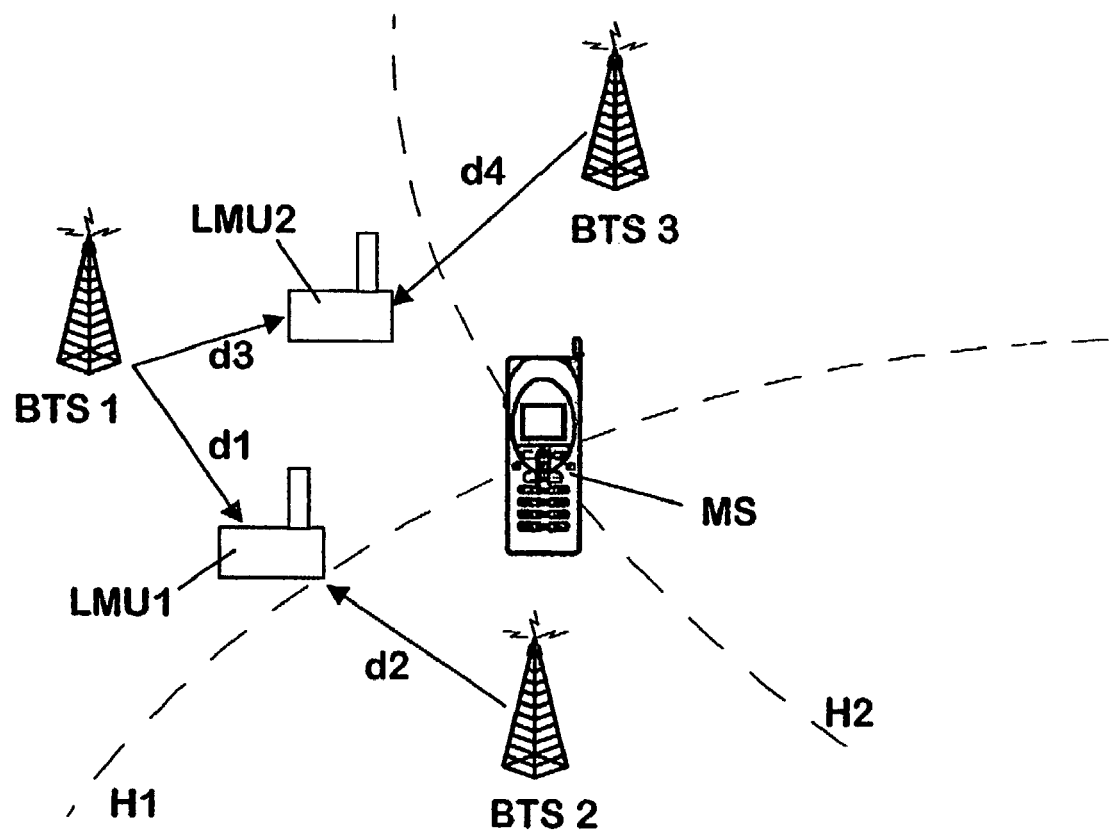
FIG. 1 illustrates a utilization of determined transmission times in a radio communications system for locating a mobile station.

In both embodiments of the first aspect of the invention, the determined AT transmission values can be used in particular for determining more accurate ATD values for two different base transceiver stations and thus for locating more accurately a mobile station as described with reference to FIG. 1.

In an embodiment of the second aspect of the invention, which is based again on the GSM communications system depicted in the upper part of FIG. 2, the changes in the transmission times of the base transceiver station BTS are to be determined reliably for further use in the GSM network.

For this embodiment of the invention it is assumed that the effect of NLOS and mulipath conditions is simply an extra, time-independent delay. Therefore, the time behavior, or drift, of the AT reception values should be the same for both measurement units LMU A, B, since a constant offset should not affect speed and direction of the drift.

Consequently, the reliability of the measurements of a single measurement unit can be improved by averaging the changes in the AT reception or transmission values for different measurement units LMU A, B.

The changes in the AT reception or transmission values can in particular be averaged with a different weighting for different measurement units LMU A, B. The measurement unit LMU A with a lower time level can then have a greater influence on the resulting slopes than the measurement unit LMU B with a higher time level.

What is claimed is:

1. Method for determining times of transmission of signals transmitted by at least one radio transmitter (BTS), the method comprising:
   transmitting signals by said at least one radio transmitter (BTS);
   receiving transmitted signals by at least two radio receivers (LMU A,B);
   determining for each of said radio receivers (LMU A,B) the respective times of reception of the received signals;
   estimating for each of said radio receivers (LMU A,B) times of transmission of said received signals based on the determined times of reception of said received signals and on the geographical location of the at least one radio transmitter (BTS) and the respective radio receiver (LMU A,B);
   filtering the estimated times of transmission based on a determined difference in the time levels of the times of transmission estimated separately for the at least two radio receivers (LMU A,B) for obtaining accurate values for the transmission times of signals transmitted by said radio transmitter (BTS).

2. Method according to claim 1, wherein the estimated times of transmission are filtered by projecting the times of transmission estimated based on signals received by a first one of said radio receivers (LMU B), which estimated times of transmission are later in time than the respective times of transmission estimated based on the signals received by another one of said radio receivers (LMU A), to the time level of the transmission times estimated based on the signals received by said other radio receiver (LMU A).

3. Method according to claim 1, wherein the estimated times of transmission are filtered by using exclusively the times of transmission estimated based on the signals received by a first one of said radio receivers (LMU A) as accurate values, which estimated times of transmission indicate respective earlier times of transmission of signals transmitted by said first radio transmitter (LMU A) than the times of transmission estimated based on the signals received by the at least one other radio receiver (LMU B).

4. Method according to claim 3, wherein in case no received signal is available for some period of time at said first radio receiver (LMU A), the times of transmission estimated based on signals received by one of said at least one other radio receiver (LMU B) are used during said period of time as accurate values after compensating an offset of the time level of the transmission times estimated based on signals received by said at least one other radio receiver (LMU B) compared to the time level of the transmission times estimated based on signals received by said first radio receiver (LMU A), which offset is determined before said period of time.

5. Method according to claim 1, wherein before filtering the estimated transmission times, the determined reception times or the estimated transmission times are corrected according to a knowledge about expected delays on the respective transmission paths.

6. Method according to claim 1, wherein signals are transmitted by said at least one radio transmitter (BTS) in multiples of a predetermined distance in time, and wherein in case one of said radio receivers (LMU A,B) receives signals which are at least once the predetermined distance in time later than the last signals received by another one of the radio receivers (LMU B,A), the difference between the determined times of reception of the at least two radio receivers (LMU A,B) or between the corresponding estimated times of transmission is reduced by a multiple of the predetermined distance in time to a difference below the predetermined distance in time before further processing.

7. Method according to claim 1, wherein each radio receiver receives signals from another one of at least two radio transmitters, which at least two radio transmitters have an essentially equal timing for transmitting signals, and wherein a common accurate transmission time is obtained for the at least two radio receivers by filtering the estimated transmission times.

8. Method according to claim 1, wherein each radio receiver receives signals from at least two different radio transmitters for at least one of which transmitters accurate values for the times of transmission are determined by filtering estimated transmission times, wherein in addition the difference in the reception time between signals received from said at least two radio transmitters is determined for at least one radio receiver, and wherein based on the determined difference in the reception time and on information about the geometrical situation the difference in timing used by the two radio transmitters for transmitting signals is determined.

9. Method according to claim 8, wherein a determined difference in timing used by at least two radio transmitters for transmitting signals is exploited for determining a current location of a mobile station receiving signals from said at least two radio transmitters.

10. Method according to claim 8, wherein a difference in timing for transmitting signals is determined for at least two different pairs of at least three radio transmitters, wherein for each of the at least two pairs of radio transmitters the difference in the time of reception at a mobile station of signals transmitted by the radio transmitters of the respective pair of radio transmitters is determined, and wherein the current geographical location of the mobile station is determined based on the respective differences in the time of reception of signals determined in the mobile station and on the determined differences in the timing used by said two pairs of radio transmitters.

11. Method for determining changes in the times of transmission of signals transmitted by at least one radio transmitter (BTS), the method comprising:
   transmitting signals by said at least one radio transmitter (BTS);
   receiving transmitted signals by at least two radio receivers (LMU A,B);
   determining for each of said radio receivers (LMU A,B) values indicative of the respective changes in the times of reception of the received signals;
   averaging the values indicative of the respective changes of times of reception determined for said at least two radio receivers (LMU A,B) for obtaining a reliable information about the changes of the times of transmission of the signals transmitted by said at least one radio transmitter (BTS).

12. Method according to claim 11, wherein signals are transmitted by said at least one radio transmitter (BTS) in multiples of a predetermined distance in time, and wherein in case one of said radio receivers (LMU A,B) receives signals which are at least once the predetermined distance in time later than the last signals received by another one of the radio receivers (LMU B,A), the difference between the determined times of reception of the at least two radio receivers (LMU A,B) or between the corresponding estimated times of transmission is reduced by a multiple of the predetermined distance in time to a difference below the predetermined distance in time before further processing.

13. Method according to claim 11, wherein each radio receiver receives signals from another one of at least two radio transmitters, which at least two radio transmitters have an essentially equal timing for transmitting signals, and wherein a common accurate transmission time is obtained for the at least two radio receivers by filtering the estimated transmission times.

14. Method according to claim 11, wherein each radio receiver receives signals from at least two different radio transmitters for at least one of which transmitters accurate values for the times of transmission are determined by filtering estimated transmission times, wherein in addition the difference in the reception time between signals received from said at least two radio transmitters is determined for at least one radio receiver, and wherein based on the determined difference in the reception time and on information about the geometrical situation the difference in timing used by the two radio transmitters for transmitting signals is determined.

15. Radio communications system comprising
at least one radio transmitter (BTS) for transmitting radio signals,
at least two radio receivers (LMU A,B) for receiving signals transmitted by said at least one radio transmitter (BTS) and for determining the respective times of reception of received signals;
processing means for estimating for each of said radio receivers (LMU A,B) times of transmission of said received signals based on the determined times of reception of said received signals and on the geographical location of the at least one radio transmitter (BTS) and the respective radio receiver (LMU A,B), and for filtering the times of transmission estimated based on a determined difference in the time level of the times of transmission estimated separately for the at least two radio receivers (LMU A,B) for obtaining accurate values for the transmission times of signals transmitted by said radio transmitter (BTS).

16. Radio communications system according to claim 15, wherein said processing means filter the estimated times of transmission by projecting the times of transmission estimated based on signals received by a first one of said radio receivers (LMU B), which estimated times of transmission are later in time than the respective times of transmission estimated based on the signals received by another one of said radio receivers (LMU A), to the time level of the transmission times estimated based on the signals received by said other radio receiver (LMU A).

17. Radio communications system according to claim 12, wherein said processing means filter the estimated times of transmission by using exclusively the times of transmission estimated based on the signals received by a first one of said radio receivers (LMU A) as accurate values for the times of transmission, which estimated times of transmission indicate respective earlier times of transmission of said signals transmitted by said radio transmitter (BTS) than the times of transmission estimated based on the signals received by at least one other of said radio receivers (LMU B).

18. Radio communications system according to claim 17, wherein in case there is no received signal available for some period of time at said first radio receiver (LMU A), said processing means use during said period of time the times of transmission estimated based on signals received by one of said at least one other radio receiver (LMU B) as accurate values after compensating an offset in the time level of the transmission times estimated based on signals received by said other radio receiver (LMU B) compared to the time level of the transmission times estimated based on signals received by said first radio receiver (LMU A), which offset is determined before said period of time.

19. Radio communications system according to claim 15, wherein the processing means correct the determined reception times or the estimated transmission times according to a knowledge about expected delays on the respective transmission paths before filtering the estimated transmission times.

20. Radio communications system according to claim 15, wherein signals are transmitted by said at least one radio transmitter (BTS) in multiples of a predetermined distance in time, and wherein, in case one of the radio receivers receives (LMU A) a signal which is at least once the predetermined distance in time later than the last signal received by another one of said radio receivers (LMU B), the processing unit reduces the difference between the determined times of reception of the at least two radio receivers (LMU A,B) or between the corresponding estimated times of transmission by a multiple of the predetermined distance in time to a difference below the predetermined distance in time before further processing.

21. Radio communications system according to claim 15, wherein the at least one radio transmitter is at least two radio transmitters which have an essentially equal timing for transmitting signals, wherein each radio receiver receives signals from another one of said at least two radio transmitters, and wherein the processing means obtain a common accurate transmission time for the at least two radio receivers by filtering the estimated transmission times.

22. Radio communications system according to claim 15, wherein said at least one radio transmitter is at least two radio transmitters, wherein each of said at least two radio receivers receives signals from at least two different radio transmitters, the processing means determining for at least one of said radio transmitters accurate values for the times of transmission by filtering estimated times of transmission, wherein the processing means determine in addition the difference in the reception time of signals received from said at least two radio transmitters for at least one radio receiver, and wherein the processing means determine based on the determined difference in the reception time and on information about the geometrical situation the difference in timing used by the two radio transmitters for transmitting signals.

23. Radio communications system according to claim 22 further including a mobile station, wherein said at least two radio transmitters are at least three radio transmitters, wherein said mobile station or said processing means determines for each of the at least two pairs of radio transmitters the difference in the time of reception of signals transmitted by the radio transmitters of the respective pair of radio transmitters, and wherein the processing means determine the current geographical location of said mobile station based on the respective differences in the time of reception of signals determined in the mobile station and on the determined differences in the timing used by said two pairs of radio transmitters for transmitting signals.

24. Processing means for a radio communications system according to claim 15.

25. Radio communications system comprising
    at least one radio transmitter (BTS) for transmitting radio signals,
    at least two radio receivers (LMU A,B) for receiving signals transmitted by the at least one radio transmitter (BTS); and
    processing means for determining for each of said radio receivers (LMU A,B) values indicative of the respective changes in the times of reception of the received signals, and for averaging the values indicative of the respective changes of the determined times of reception determined for said at least two radio receivers (LMU A,B) in order to obtain a reliable information about the changes of the times of transmission of the signals transmitted by said at least one radio transmitter (BTS).

26. Radio communications system according to claim 25, wherein signals are transmitted by said at least one radio transmitter (BTS) in multiples of a predetermined distance in time, and wherein, in case one of the radio receivers receives (LMU A) a signal which is at least once the predetermined distance in time later than the last signal received by another one of said radio receivers (LMU B), the processing unit reduces the difference between the determined times of reception of the at least two radio receivers (LMU A,B) or between the corresponding estimated times of transmission by a multiple of the predetermined distance in time to a difference below the predetermined distance in time before further processing.

27. Radio communications system according to claim 25, wherein the at least one radio transmitter is at least two radio transmitters which have an essentially equal timing for transmitting signals, wherein each radio receiver receives signals from another one of said at least two radio transmitters, and wherein the processing means obtain a common accurate transmission time for the at least two radio receivers by filtering the estimated transmission times.

28. Radio communications system according to claim 25, wherein said at least one radio transmitter is at least two radio transmitters, wherein each of said at least two radio receivers receives signals from at least two different radio transmitters, the processing means determining for at least one of said radio transmitters accurate values for the times of transmission by filtering estimated times of transmission, wherein the processing means determine in addition the difference in the reception time of signals received from said at least two radio transmitters for at least one radio receiver, and wherein the processing means determine based on the determined difference in the reception time and on information about the geometrical situation the difference in timing used by the two radio transmitters for transmitting signals.

29. Processing means for a radio communications system according to claim 25.

* * * * *